United States Patent
Gilliland et al.

(10) Patent No.: US 10,814,960 B1
(45) Date of Patent: Oct. 27, 2020

(54) DYNAMIC ROTOR-PHASING UNIT

(71) Applicant: Bell Textron Inc., Fort Worth, TX (US)

(72) Inventors: Colton Gilliland, Northlake, TX (US); Tyson Henry, Arlington, TX (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 16/991,664

(22) Filed: Aug. 12, 2020

Related U.S. Application Data

(62) Division of application No. 16/244,512, filed on Jan. 10, 2019.

(51) Int. Cl.
  *B64C 11/50* (2006.01)
  *F16H 1/28* (2006.01)
(52) U.S. Cl.
  CPC ............... *B64C 11/50* (2013.01); *F16H 1/28* (2013.01)
(58) Field of Classification Search
  CPC ................................. B64C 11/50; F16H 1/28
  USPC ............................................................ 475/331
  See application file for complete search history.

(56) References Cited

U.S. PATENT DOCUMENTS

| | | | |
|---|---|---|---|
| 5,300,848 A * | 4/1994 | Huss | H02K 16/00 310/191 |
| 7,538,510 B2 * | 5/2009 | Atarashi | H02P 21/22 318/494 |
| 9,889,927 B2 | 2/2018 | Modrzejewski et al. | |
| 10,280,816 B2 * | 5/2019 | Toda | F01L 1/352 |
| 10,384,765 B2 | 8/2019 | Elliott et al. | |
| 10,451,029 B2 | 10/2019 | Bakanov et al. | |
| 2017/0308101 A1 | 10/2017 | Luszcz et al. | |
| 2018/0335136 A1 * | 11/2018 | David | F16H 61/664 |
| 2019/0063574 A1 | 2/2019 | Kopp | |
| 2019/0393755 A1 | 12/2019 | Pydin | |

* cited by examiner

*Primary Examiner* — Leslie A Nicholson, III
(74) *Attorney, Agent, or Firm* — Whitaker Chalk Swindle & Schwartz PLLC; Enrique Sanchez

(57) ABSTRACT

A dynamic rotor-phasing unit can phase rotors in-flight for dynamic rotor tuning and in an idle state for aircraft storage. The input and output shafts can be clocked (e.g., rotated) from 0 degrees apart to in excess of 360 degrees apart or from 0 degrees apart to 140 degrees apart. Such rotation can minimize the footprint of an aircraft for stowing purposes, as the rotor blades can be folded to fit within a smaller area without disconnecting the drive system. Additionally, the unit can allow tiltrotor blades to be clocked during flight, which can allow the live-tuning of the aircraft's rotor dynamics. A fail-safe rotary actuator can rotate a stationary planet carrier to clock the input shaft and the output shaft. Alternatively, an actuator can position a slider housing to clock the input shaft and the output shaft.

12 Claims, 6 Drawing Sheets

DYNAMIC ROTOR-PHASING UNIT

CROSS REFERENCE TO RELATED APPLICATION

This Application is a Divisional Application of U.S. application Ser. No. 16/244,512, filed Jan. 10, 2019, the entirety of which is herein incorporated by reference.

BACKGROUND

1. Field of the Invention

The present disclosure is generally related to rotorcraft, and more specifically to rotorcraft having adjustable-phase rotors.

2. Background of the Invention and Description of Related Art

Rotorcraft typically have rotor blades that extend radially past the fuselage to generate sufficient lift. However, the radial extension beyond the fuselage greatly increases the "footprint" of the rotorcraft, and ultimately, the area required to stow the rotorcraft. Tiltrotor aircraft, such as the V-22 Osprey by Bell Helicopter Textron Inc., can further exacerbate the expanding rotorcraft footprint with the inclusion of a wing having rotors positioned at both ends of the wing, each rotor including rotor blades that radially extend therefrom. Increased storage area requirements can limit storage options and increase costs. The rotor blades can be removed from the rotorcraft to minimize the storage area, but such a removal can be time consuming and result in lost or damaged components. The rotors can also be disconnected from a drive system and manually rotated to minimize the storage area, but such a disconnection can require personnel to manually rotate the rotor blades.

Rotor phasing techniques exist in the art, such that the rotors can be tuned. For example, Conventional phasing methods include the process of determining optimal offset positions of the rotor blades prior to flight, then retaining the rotor blades in the offset positions during flight. Alternative approaches have been implemented to address the phasing of the rotors while in flight. By way of example, U.S. Pat. No. 9,889,927, is directed to a system configured to provide real-time rotor phasing during flight. The '927 patent incorporates a clutch to phase the rotor assemblies relative to each other during flight such that the rotor blades become offset at desired angles relative to each other. The clutch is configured to connect and disconnect the output shafts 305, 307 for a predetermined time, thereby allowing the offset of the rotor blades to occur. However, such disconnection and reconnection can introduce unnecessary failures by requiring repeated, proper reconnection of the drive system, as well as being a challenge to maintain repeatable accuracy in the amount of phasing.

SUMMARY

The present disclosure teaches technical advantages as a dynamic rotor-phasing unit that can phase rotors in-flight. In one embodiment of the unit, the input and output shafts can be clocked (e.g., rotated) from 0 degrees apart to in excess of 360 degrees apart. In another embodiment of the unit, the input and output shafts can be clocked from 0 degrees apart to 140 degrees apart. Such rotation can minimize the footprint of an aircraft for stowing purposes, as the rotor blades can be folded to fit within a smaller area without disconnecting the drive system. Additionally, the unit can allow tiltrotor blades to be clocked during flight, which can allow the live-tuning of the aircraft's rotor dynamics. The disclosed technical advantages are applicable to any two-rotor aircraft. The rotors can be in-line in the x-, y-, or z-axes, stacked, offset, or in any suitable configuration.

In one exemplary embodiment, a fail-safe rotary actuator can rotate a stationary planet carrier to clock the input shaft and the output shaft. This embodiment allows the rotors to be locked from 0 degrees apart to more than 360 degrees apart. The clocking planets can move around a sun gear and a rotating ring gear to clock the shafts. The rotating ring gear can transmit torque to common gears. The last gear set ratio can be configured, such that the input and output speeds are the same, if on an Interconnect Driveshaft System (ICDS).

In another exemplary embodiment, an actuator can pull on the slider housing to clock the input shaft and the output shaft. This embodiment allows the rotors to be clocked from 0 degrees apart to 140 degrees apart. The common gears can move forward as the clocking gears move in opposite directions around the ICDS gears. The difference in mesh points from the starting position is the angle that the shafts are clocked. To clock the rotors, an actuator can pull on the slider housing. The common gears can then move forward as the clocking gears move in opposite directions around the ICDS gears. The difference in mesh points from the starting position is the angle that the driveshafts can be clocked.

Accordingly, one embodiment of the present disclosure can include a planetary dynamic rotor-phasing unit, comprising: a stationary planet carrier; a clocking planet gear operably coupled to the stationary planet carrier; a rotating ring gear; and a rotary actuator configured to rotate the stationary planet carrier, wherein the clocking planet gear rotates around the stationary carrier and the rotating ring gear to create a phasing differential between an input shaft and an output shaft. The rotating ring gear can transmit torque to the common gears. A last gear set ratio can be configured such that the input and output speeds are the same. The phasing differential between the input shaft and the output shaft can vary between 0 degrees and 360 degrees, exceed 360 degrees, or other suitable angles. The phasing differential between the input shaft and the output shaft can vary during flight.

Another embodiment of the present disclosure can include a slider dynamic rotor-phasing unit, comprising: a slider housing; an actuator; a common gear; and a clocking gear, wherein the actuator can pull the slider housing toward an ICDS gear to create a phasing differential between an input shaft and an output shaft. The actuator can cause the common gear to move toward or away from the ICDS gear when the actuator is activated. The operation of the actuator can cause the clocking gear to rotate above or below a plane of the ICDS gear. The actuator can be a telescoping actuator, or other suitable actuator. The difference in the clocking gear mesh points from its starting position can identify the angle that the input shaft and the output shaft are clocked.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
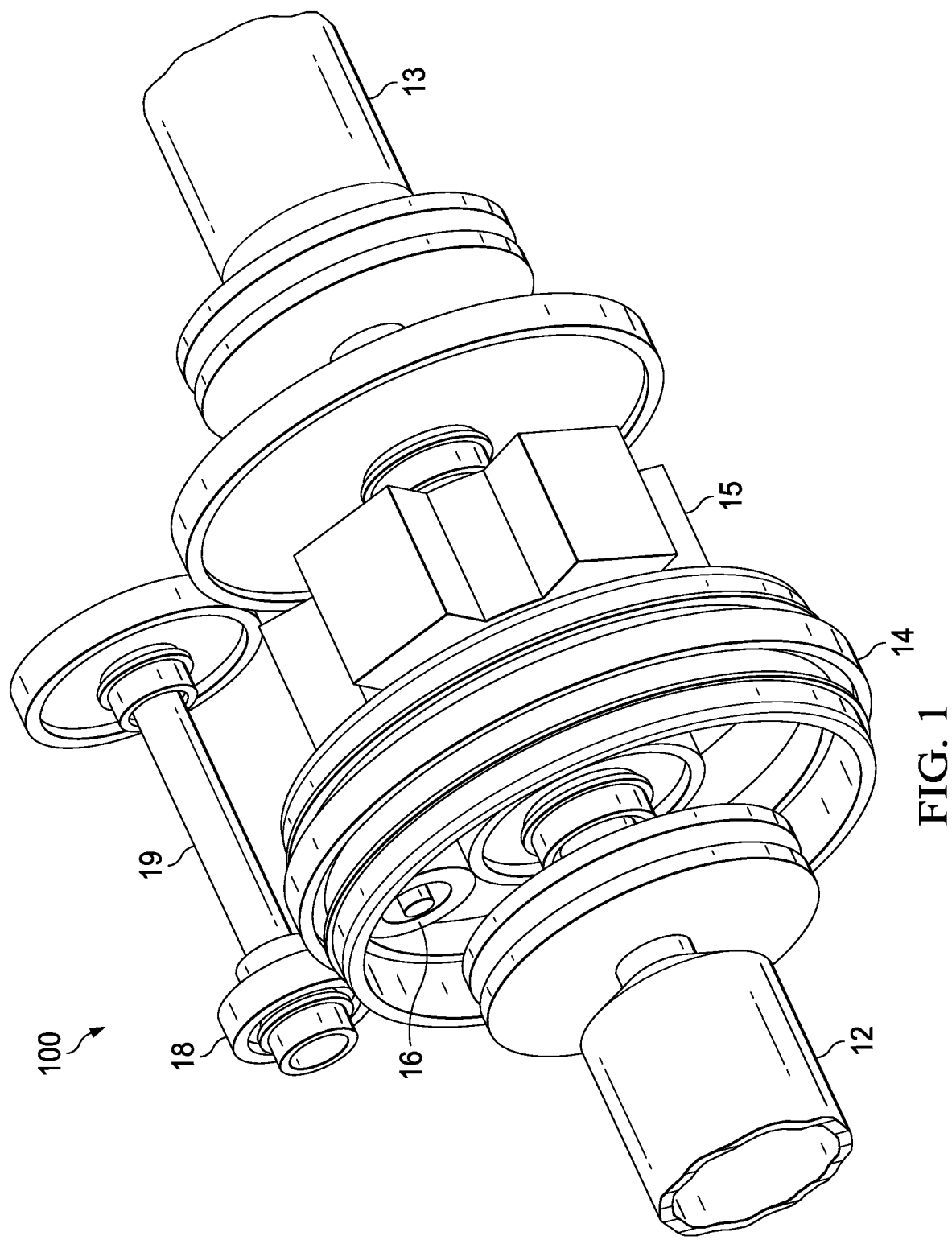
FIG. 1 is a perspective view of a dynamic rotor-phasing unit, in accordance with an embodiment of the present disclosure.

FIG. 1 is a perspective view of a dynamic rotor-phasing unit, generally designated as 10, in accordance with an embodiment of the present disclosure. A dynamic rotor-phasing unit 100 can be operably coupled to and driven by an aircraft engine via an input drive shaft 12. The dynamic rotor-phasing unit 100 can receive the input drive shaft 12 and transfer torque to one or more rotors via an output drive shaft 13. Advantageously, the dynamic rotor-phasing unit 100 can be configured to selectively control the phase between the input shaft 12 and output shaft 13, varying between 0 degrees apart to over 360 degrees apart. The dynamic rotor-phasing unit 100 can be configured to adjustably offset the rotational movement of the output shaft 13 relative to the input shaft 12. Such offset can manifest in the offset of the rotor blade positions of the rotors relative to each other.

In one embodiment, the dynamic rotor-phasing unit 100 can be configured in a planetary gear configuration, including a rotating ring gear 14, an actuator 15, a clocking planet gear 16, a stationary planetary carrier 17, a common gear 18, and a common shaft 19. Alternatively, multiple planet gears 16 can be implemented. The actuator 15 can rotate about its axis to create an angular misalignment. As the planetary system rotates, the input shaft 12 can theoretically achieve an infinite angular misalignment with the output shaft 13. However, typical angular offsets can be less than 90 degrees, as measured at the rotors. Due to additional torque multiplication, angular offset at the rotor phasing unit does not necessarily have to correspond to equal angular offset at the rotor blades.

Figure 2A:
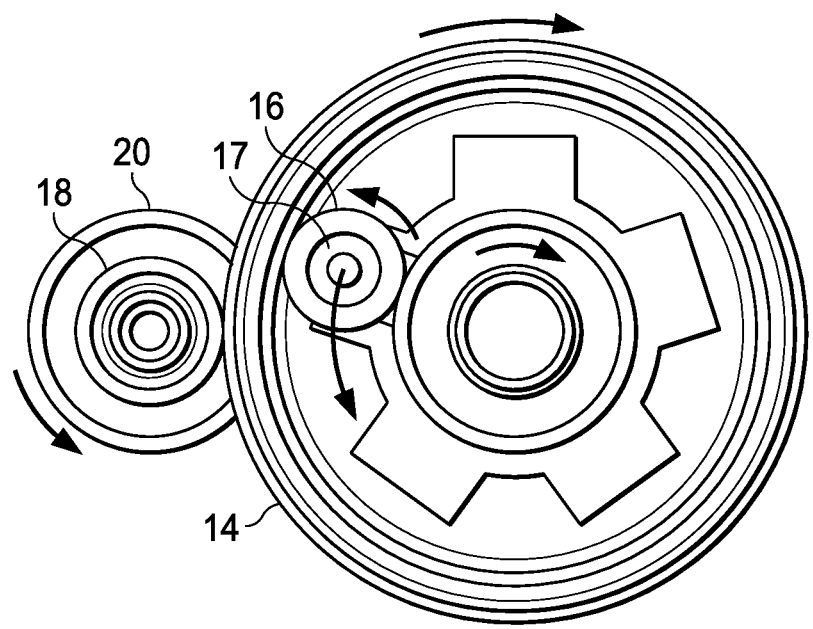
FIG. 2A is a cross-sectional view of a dynamic rotor-phasing unit at a first phase, in accordance with one embodiment of the present disclosure.
Figure 2B:
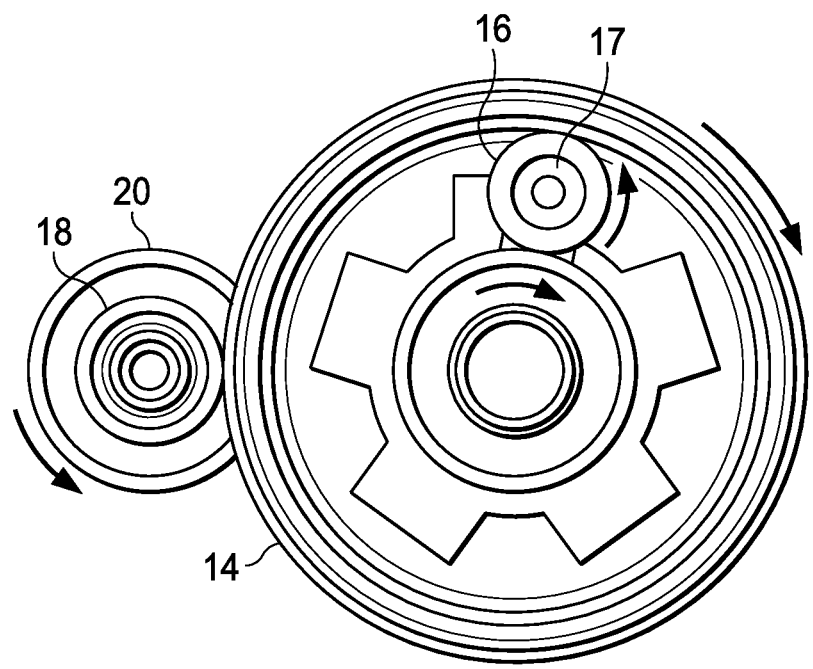
FIG. 2B is a cross-sectional view of a dynamic rotor-phasing unit at a second phase, in accordance with one embodiment of the present disclosure.

FIG. 2A is a cross-sectional view of a dynamic rotor-phasing unit at a first phase, in accordance with one embodiment of the present disclosure. FIG. 2B is a cross-sectional view of a dynamic rotor-phasing unit at a second phase, in accordance with one embodiment of the present disclosure. The clocking planet gear 16 can move around the stationary planetary carrier 17 and rotating ring gear 14 to clock the input shaft 12 and output shaft 13. The rotating ring gear 14 can transmit torque to the common gears 18. The last gear set ratio can be configured such that the rotational speed of the input shaft 12 and the rotational speed of the output shaft 13 can be substantially the same, if operably coupled to the ICDS. Advantageously, a rotary actuator 15 can rotate the stationary planetary carrier 17 to create an angular misalignment. The clocking planet gear 16 can move around the rotating ring gear 14 to clock the shafts 12 and 13. The rotating ring gear 14 and the common gear 18 can be capable of rotating about the fixed planetary carrier 17.

Figure 3:
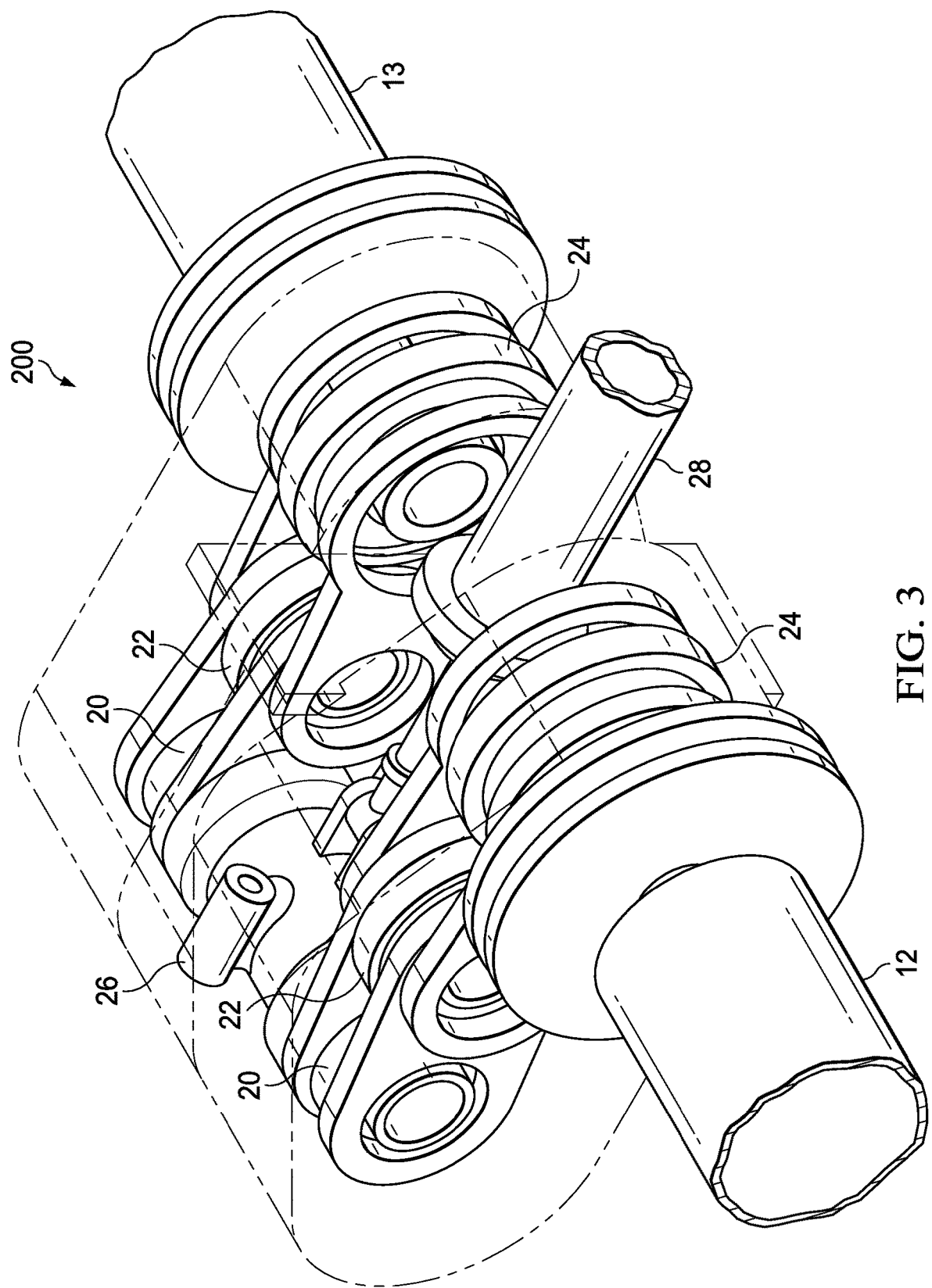
FIG. 3 is a perspective view of a dynamic rotor-phasing unit, in accordance with another embodiment of the present disclosure.

FIG. 3 is a perspective view of a dynamic rotor-phasing unit, generally designated 200, in accordance with another embodiment of the present disclosure. In another embodiment, the dynamic rotor-phasing unit 100 can be configured in a slider configuration, including common shaft gears 20, clocking gears 22, ICDS gears 24, a slider housing 26, and an actuator 28, when a lower angular phasing is suitable. ICDS gears 24 can be operatively coupled to clocking gears 22, one for each ICDS gear 24. One clocking gear 22 can rotate down and one clocking gear 22 can rotate up. Common shaft gears 20 can be meshed with clocking gears 22 on both sides. The common shaft gears 20 can link the two clocking gears 22 together to complete the drive path. The slider housing 26 can be attached to an actuator 28 that can extend and retract to push the clocking gears 22 in opposite directions to create an angular misalignment between the input shaft 12 and the output shaft 13. The common gears 20 can move forward as the clocking gears 22 move in opposite directions around the ICDS gears 24. The difference in mesh points from the starting position can be the angle that the shafts 12 and 13 are clocked.

Figure 4A:
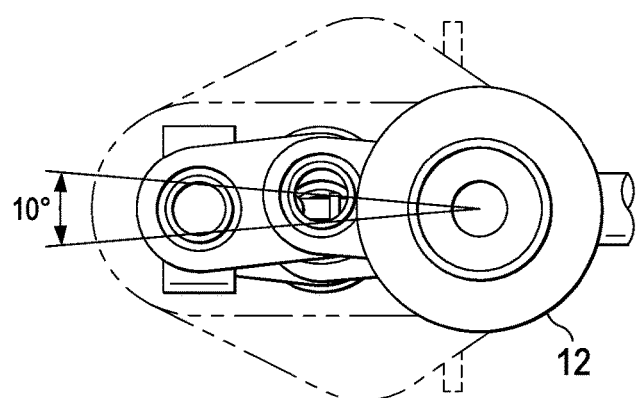
FIG. 4A is a cross-sectional view of a dynamic rotor-phasing unit with 10 degree phasing, in accordance with another embodiment of the present disclosure.
Figure 4B:
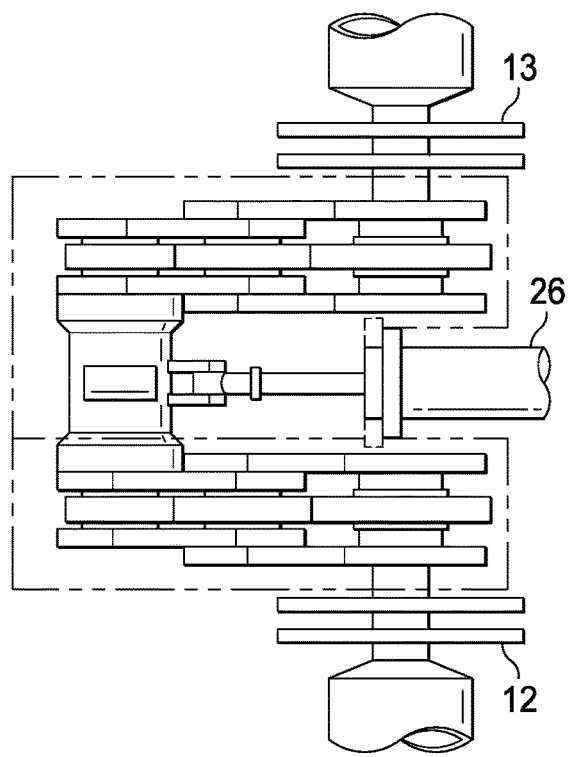
FIG. 4B is a top view of a dynamic rotor-phasing unit with an actuator positioned for 10 degree phasing, in accordance with another embodiment of the present disclosure.
Figure 4C:
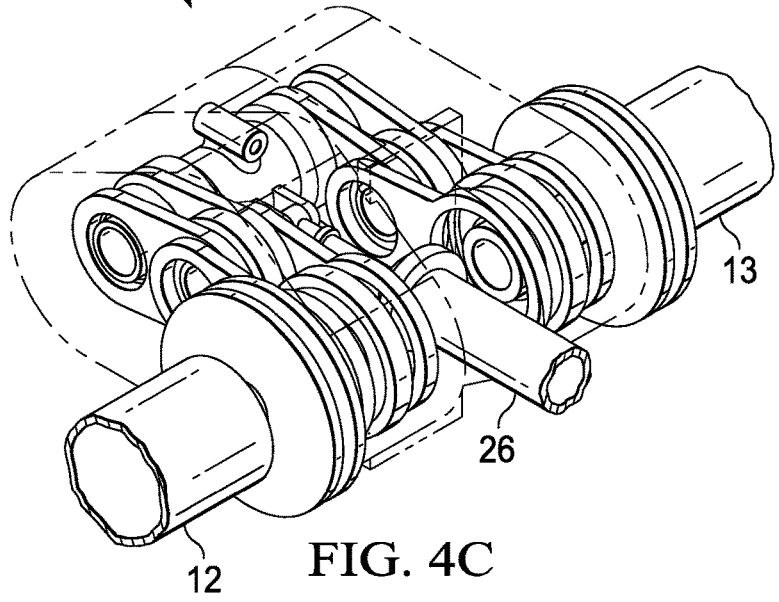
FIG. 4C is a perspective view of a dynamic rotor-phasing unit with an actuator positioned for 10 degree phasing, in accordance with another embodiment of the present disclosure.

FIGS. 4A-4C are cross-sectional, top, and perspective views, respectively, of a dynamic rotor-phasing unit with an actuator positioned for 10 degree phasing, in accordance with another embodiment of the present disclosure. In one aspect of the present embodiment, the actuator 26 of the dynamic rotor-phasing unit 200 can be positioned for 10 degree total angular differential as a constant position, resulting in a 10 degree phasing differential between the input shaft 12 and the output shaft 13. As the actuator pulls in the clocking gears rotate to create an angular differential. As the actuator retracts, the slider housing 26 slides closer to the ICDS gears 24, the angle between the ICDS gears 24 and the raised clocking gear 22 and the lowered clocking gear 22 increases up to 140 degrees.

Figure 5A:
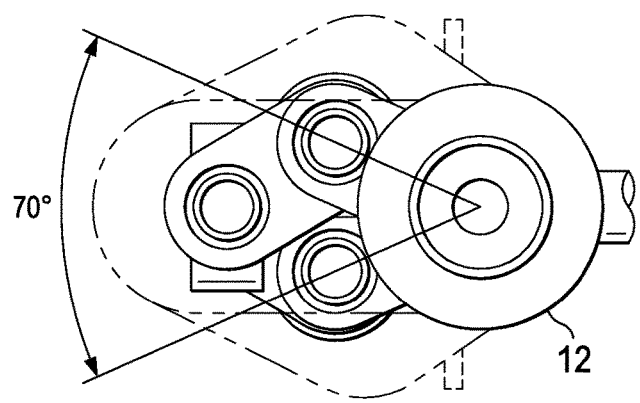
FIG. 5A is a cross-sectional view of a dynamic rotor-phasing unit with 70 degree phasing, in accordance with another embodiment of the present disclosure.
Figure 5B:
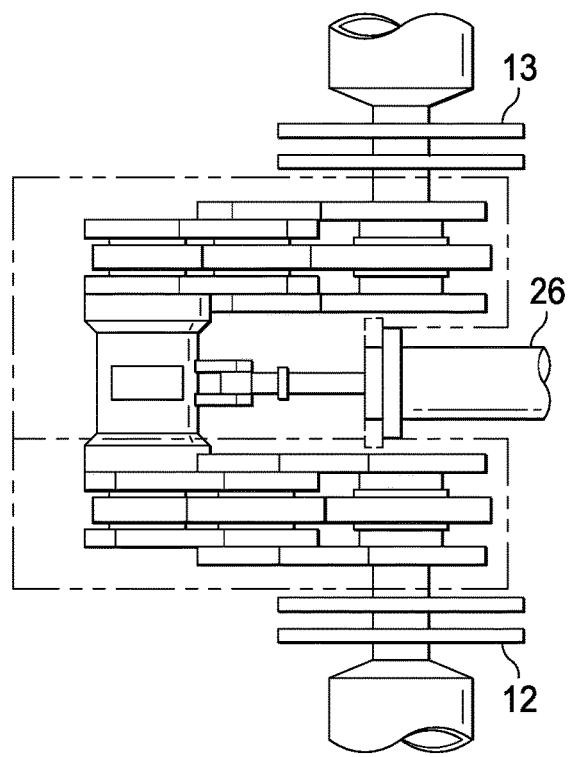
FIG. 5B is a top view of a dynamic rotor-phasing unit with an actuator positioned for 70 degree phasing, in accordance with another embodiment of the present disclosure.
Figure 5C:
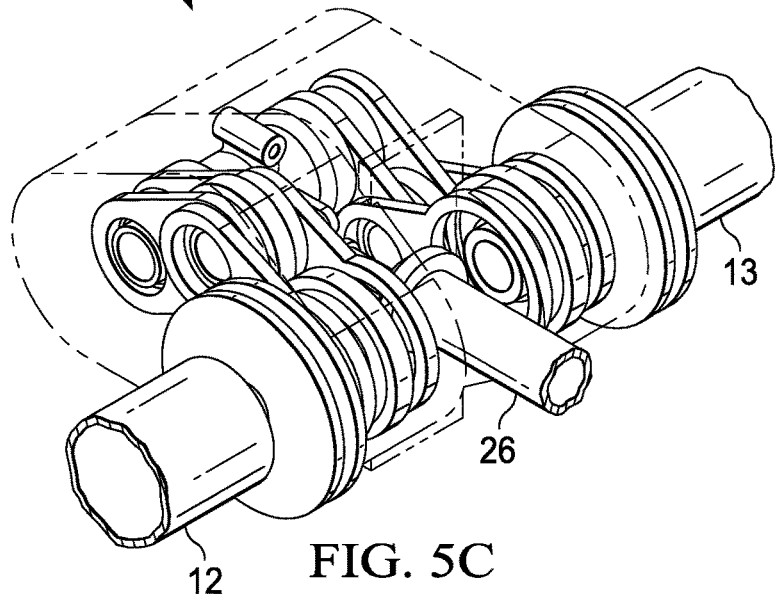
FIG. 5C is a perspective view of a dynamic rotor-phasing unit with an actuator positioned for 70 degree phasing, in accordance with another embodiment of the present disclosure.

FIGS. 5A-5C are cross-sectional, top, and perspective views, respectively, of a dynamic rotor-phasing unit with an actuator positioned for 70 degree phasing, in accordance with another embodiment of the present disclosure. In another aspect of the present embodiment, the actuator 26 of the dynamic rotor-phasing unit 200 continues to slide the slider housing 26 closer to the ICDS gears 24, such that the angle between the ICDS gears 24 and the raised clocking gear 22 and the lowered clocking gear 22 can have a 70 degree total angular differential, resulting in a 70 degree phasing differential between the input shaft 12 and the output shaft 13.

Figure 6A:
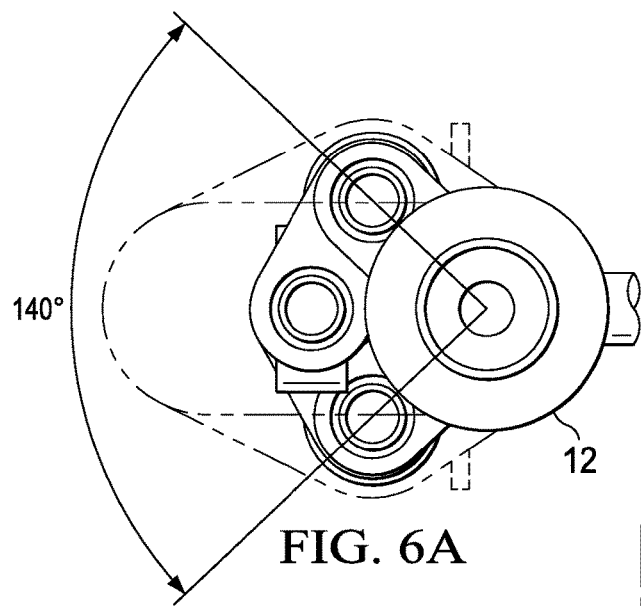
FIG. 6A is a cross-sectional view of a dynamic rotor-phasing unit with 140 degree phasing, in accordance with another embodiment of the present disclosure.
Figure 6B:
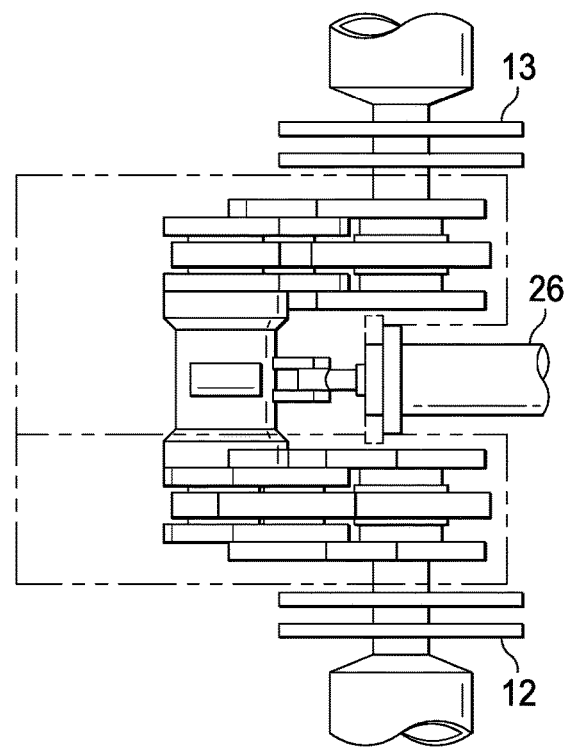
FIG. 6B is a top view of a dynamic rotor-phasing unit with an actuator positioned for 140 degree phasing, in accordance with another embodiment of the present disclosure.
Figure 6C:
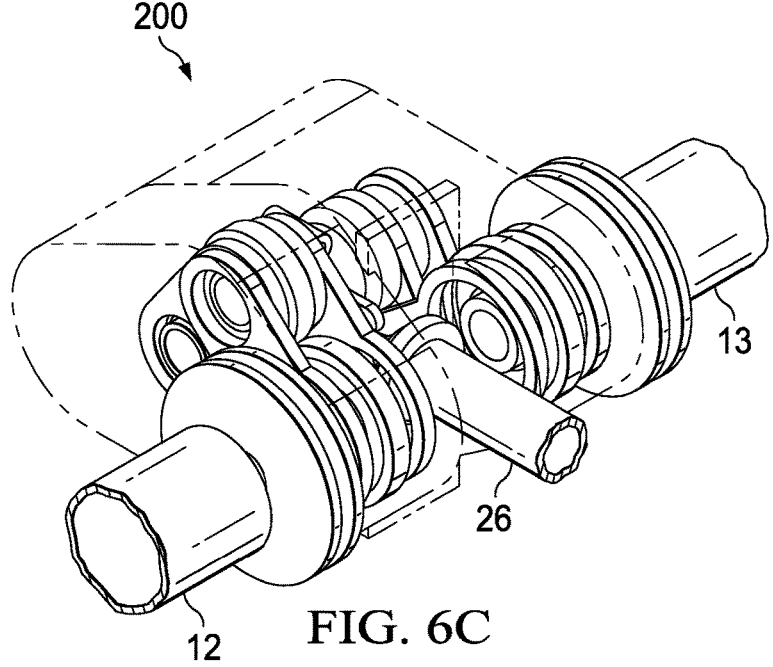
FIG. 6C is a perspective view of a dynamic rotor-phasing unit with an actuator positioned for 140 degree phasing, in accordance with another embodiment of the present disclosure.

FIGS. 6A-6C are cross-sectional, top, and perspective views, respectively, of a dynamic rotor-phasing unit with an actuator positioned for 140 degree phasing, in accordance with another embodiment of the present disclosure. In another aspect of the present embodiment, the actuator 26 of the dynamic rotor-phasing unit 200 continues to slide the slider housing 26 closer to the ICDS gears 24, such that the angle between the ICDS gears 24 and the raised clocking gear 22 and the lowered clocking gear 22 can have a maximum 140 degree total angular differential, resulting in a 140 degree phasing differential between the input shaft 12 and the output shaft 13. Similarly, the actuator can be extended to push the slider housing 26 away from the ICDS gears 24, such that the angle between the ICDS gears 24 and the raised clocking gear 22 and the lowered clocking gear 22 can be reduced to a minimum 10 degree total angular differential, resulting in a 10 degree phasing differential between the input shaft 12 and the output shaft 13.

The present invention achieves at least the following advantages:

1. The rotors can be phased, inflight, thereby allowing for live-tuning of the aircraft's rotor dynamics;
2. the rotors can be phased, while the aircraft is idle to minimize the aircraft's footprint for storage; and
3. the planetary system can provide for theoretically infinite phasing; and
4. the input and output shafts are never disconnected to mitigate potential failure points in the aircraft.

While the disclosure has described a number of embodiments, it is not thus limited and is susceptible to various changes and modifications without departing from the spirit thereof. In particular, although a certain phase angle differentials were disclosed in some of the embodiments and figures described herein, any suitable phase angle differential can be implemented. Persons skilled in the art will understand that this concept is susceptible to various changes and modifications, and can be implemented or adapted readily to other types of environments. Further, the individual elements of the claims are not well-understood, routine, or conventional. Instead, the claims are directed to the unconventional inventive concept described in the specification.

What is claimed is:

1. A planetary dynamic rotor-phasing unit, comprising:
   a stationary planet carrier;
   a clocking planet gear operably coupled to the stationary planet carrier;
   a rotating ring gear; and
   a rotary actuator configured to rotate the stationary planet carrier, wherein the clocking planet gear rotates around the stationary carrier and the rotating ring gear to create a phasing differential between an input shaft and an output shaft.

2. The planetary dynamic rotor-phasing unit of claim 1, wherein the rotating ring gear transmits torque to the common gears.

3. The planetary dynamic rotor-phasing unit of claim 1, wherein a last gear set ratio is such that the input and output speeds are the same.

4. The planetary dynamic rotor-phasing unit of claim 1, wherein the phasing differential between the input shaft and the output shaft can vary between 0 degrees and 360 degrees.

5. The planetary dynamic rotor-phasing unit of claim 4, wherein the phasing differential between the input shaft and the output shaft can vary during flight.

6. The planetary dynamic rotor-phasing unit of claim 1, wherein the phasing differential between the input shaft and the output shaft can exceed 360 degrees.

7. A method for creating a phasing differential in a planetary rotor-phasing unit, comprising:
   rotating a clocking planet gear around a stationary carrier and the rotating ring gear to create a phasing differential between an input shaft and an output shaft; and
   transmitting torque to one or more common gears via the rotating ring gear.

8. The method of claim 7, further comprising rotating the stationary carrier to create an angular misalignment.

9. The method of claim 7, wherein a last gear set ratio is such that the input and output speeds are the same.

10. The method of claim 7, wherein the phasing differential between the input shaft and the output shaft can vary between 0 degrees and 360 degrees.

11. The method of claim 10, wherein the phasing differential between the input shaft and the output shaft can vary during flight.

12. The method of claim 7, wherein the phasing differential between the input shaft and the output shaft can exceed 360 degrees.

* * * * *

UNITED STATES PATENT AND TRADEMARK OFFICE
CERTIFICATE OF CORRECTION

PATENT NO. : 10,814,960 B1
APPLICATION NO. : 16/991664
DATED : October 27, 2020
INVENTOR(S) : Gilliland et al.

Page 1 of 1

It is certified that error appears in the above-identified patent and that said Letters Patent is hereby corrected as shown below:

On the Title Page

Item (71), in Applicant, in Column 1, --Beil Textron Inc.-- should be changed to --Bell Textron Inc.--.

Signed and Sealed this
Fifth Day of January, 2021

Andrei Iancu
*Director of the United States Patent and Trademark Office*